(12) United States Patent
Metzler (10) Patent No.: US 9,513,139 B2
(45) Date of Patent: Dec. 6, 2016

(54) METHOD FOR VERIFYING A SURVEYING INSTRUMENTS EXTERNAL ORIENTATION

(71) Applicant: LEICA GEOSYSTEMS AG, Heerbrugg (CH)

(72) Inventor: Bernhard Metzler, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 156 days.

(21) Appl. No.: 14/296,925

(22) Filed: Jun. 5, 2014

(65) Prior Publication Data

US 2014/0348388 A1 Nov. 27, 2014

Related U.S. Application Data

(63) Continuation-in-part of application No. 13/702,055, filed as application No. PCT/EP2011/059695 on Jun. 10, 2011, now Pat. No. 8,798,319.

(30) Foreign Application Priority Data

Jun. 18, 2010 (EP) ...................................... 10166558

(51) Int. Cl.
*G06K 9/00* (2006.01)
*G01C 25/00* (2006.01)
(Continued)

(52) U.S. Cl.
CPC .................. *G01C 25/00* (2013.01); *G01C 1/02* (2013.01); *G01C 15/00* (2013.01)

(58) Field of Classification Search
None
See application file for complete search history.

(56) References Cited

U.S. PATENT DOCUMENTS 7,003,386 B1   2/2006 Ericsson et al.
8,316,237 B1  11/2012 Felsher et al.
(Continued)

FOREIGN PATENT DOCUMENTS

CN    101298979 A    11/2008
WO     99/28565 A1     6/1999
(Continued)

OTHER PUBLICATIONS

European Search Report completed Oct. 26, 2010 in priority European Application No. EP 10166558.
(Continued)

*Primary Examiner* — Weiwen Yang
(74) *Attorney, Agent, or Firm* — Maschoff Brennan (57) ABSTRACT

Verifying surveying instrument's external orientation during a measurement process, comprising directing the imaging means onto a reference object and detecting a first photographing direction of the imaging means, taking a first image of the reference object in the first photographing direction, memorizing the first image and the first photographing direction as being indicative of the surveying instrument's external orientation, re-directing the imaging means onto the reference object and detecting a second photographing direction of the imaging means, taking a second image of the reference object in the second photographing direction, and comparing a first with a second imaged position of the reference object in the first respectively the second image by image processing as well as the first with the second photographing direction and verifying the surveying instrument's external orientation based on disparities between the first and the second imaged position and/or between the first and the second photographing direction.

22 Claims, 4 Drawing Sheets

(51) Int. Cl.
*G01C 15/00* (2006.01)
*G01C 1/02* (2006.01)

(56) References Cited

U.S. PATENT DOCUMENTS

| | | | |
|---|---|---|---|
| 8,629,905 | B2 | 1/2014 | Svanholm |
| 2006/0013475 | A1 | 1/2006 | Philomin et al. |
| 2009/0138233 | A1 | 5/2009 | Kludas et al. |
| 2010/0232728 | A1* | 9/2010 | Leprince ............... G01C 11/02 382/294 |
| 2011/0023578 | A1 | 2/2011 | Grässer |

FOREIGN PATENT DOCUMENTS

WO 2009/100773 A1 8/2009
WO 2009/106144 A1 9/2009

OTHER PUBLICATIONS

Hu Haifeng et al., "The Determination of the Intrinsic and Extrinsic Parameters of Camera for 3D Machine Vision", ACTA Scientiarum Naturalium Universitatis Sunyatseni, vol. 41, No. 6, Nov. 2002, pp. 22-25 (see English Abstract, p. 25).

\* cited by examiner

METHOD FOR VERIFYING A SURVEYING INSTRUMENTS EXTERNAL ORIENTATION

CROSS-REFERENCE TO RELATED APPLICATIONS

This application is a continuation of U.S. application Ser. No. 13/702,055, which is the national stage of International Application No. PCT/EP2011/059695, filed Jun. 10, 2011, which claims priority to European Application No. 10166558.6, filed on Jun. 18, 2010. The foregoing applications are incorporated herein by reference.

FIELD OF THE INVENTION

The invention pertains to a surveying method and especially to a method for verifying a surveying instrument's external orientation as well as to a surveying instrument, being designed for executing the inventive method.

BACKGROUND

When setting up a surveying instrument such as a total station, it is necessary to determine the surveying instrument's orientation. Generally, the orientation of a surveying instrument corresponds to the deviation of the surveying instrument's alignment (direction zero of the angle measurement means) from the north direction (heading), that is—according to the common geodetic convention—from an x-axis of a horizontal coordinate system. To determine the orientation of the surveying instrument, an angle from the surveying instrument to at least one comparatively far distanced reference object having known coordinate data is measured. In general, the distance of such a reference object has to be at least 1 km.

Examples for such reference objects are a church tower cross, a cross on the summit of a mountain (summit cross), a high chimney or other distinctive objects being visibly over a long distance. Coordinate data of these reference objects in general are provided by public authorities e.g. the "Bundesamt fur Landestopographie swisstopo" in Switzerland.

Figure 1:
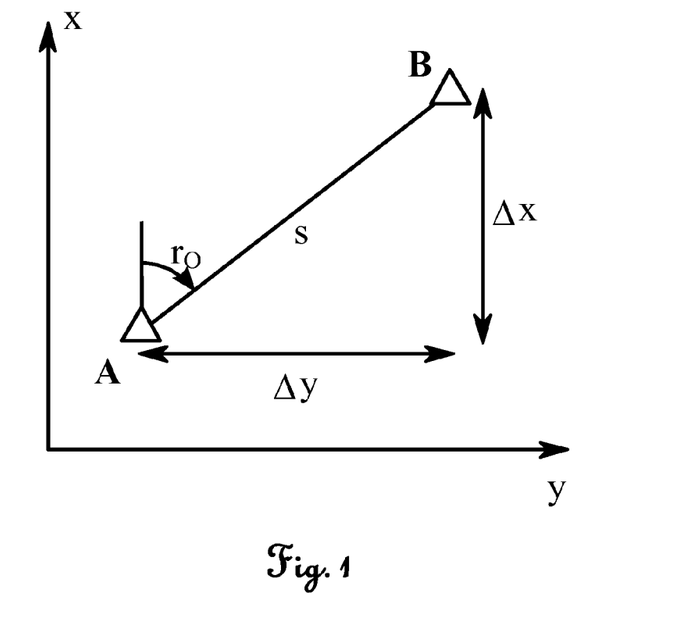
FIGS. 1 and 2 are diagrams for generally explaining the determination of a surveying instrument's orientation.
Figure 2:
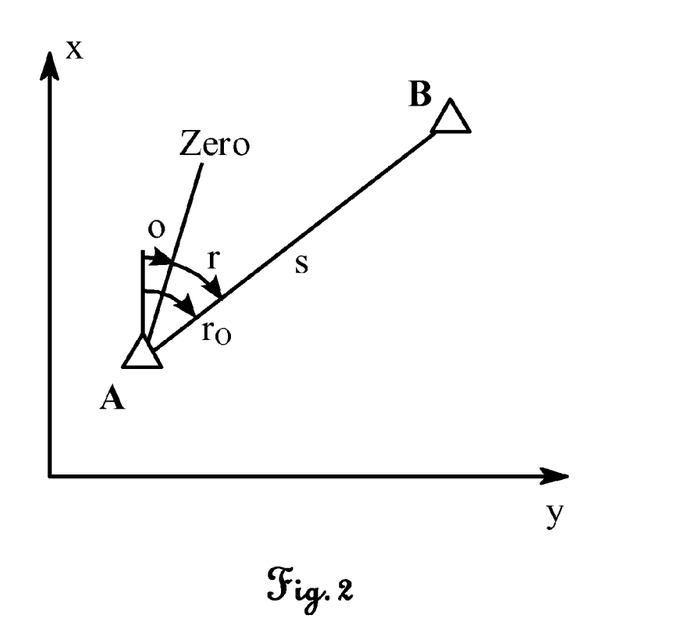

A prior art method for determining a surveying instrument's orientation is described on the basis of FIGS. 1 and 2. In order to determine the surveying instrument's orientation, an angle $\theta$ between the surveying instrument's direction zero and the x-axis of the coordinate system (usually corresponding to the north direction) is determined. That is, the orientation of a surveying instrument in general is defined as the angle between the x-axis (north direction) and the surveying instrument's direction zero.

If the coordinate data of the setup point of the surveying instrument A and of the reference object B are known, from the coordinate data an oriented direction angle $r_0$ may be calculated. The orientation direction angle is the angle between the x-axis and the line S connecting the position of the surveying instrument and the reference object B. After setting up the surveying instrument, the direction angle r to the reference object, that is, the angle between the direction zero of the surveying instrument and the line connecting the position of the surveying instrument and the reference object B is measured and the orientation angle O is determined as:

$$O = r_0 - r$$

In use of the surveying instrument in the field, it may happen that the surveying instrument's external orientation changes slightly for several reasons, e.g. because one foot of the tripod sinks into plaint ground, because of an inadvertent push or hit onto the surveying instrument or similar. Therefore, the surveying instrument's external orientation may be verified during a measurement process a while after starting the measurement tasks, i.e. in a proceeded or later state of the measurement process. Such a verification of the orientation may ensure that the surveying instrument didn't change and still is exactly in the initially determined orientation or, in case of a change in the orientation, may indicate that its external orientation has to be newly determined.

For verifying the surveying instrument's orientation, after a while, the direction angle $r_2$ from the surveying instrument to the reference object B is again determined, and then the new reference angle is compared with the originally determined direction angle $r_1$.

$$\Delta O = O_2 - O_1$$
$$= (r_0 - r_2) - (r_0 - r_1)$$
$$= r_1 - r_2$$

If the change of the orientation $\Delta O$ exceeds a predetermined value, the surveying instrument's orientation is to be newly determined. Therein, it may be remarked that the change of the orientation $\Delta O$ can be determined without knowing the absolute external orientation values $O_2$ and $O_1$. However, according to methods of the state of the art, such a verification method has to be carried out completely manually and is, therefore, cumbersome. Also, the reliability depends on the skill of the operating person.

Exemplarily, WO 2009/106144 A1 roughly describes a verifying procedure for checking if the originally determined orientation of a surveying instrument did or did not change during a measurement session in the field, see page 25, lines 25-33 of WO 2009/106144 A1:

"The orientation of the instrument with respect to a known direction may be needed when measuring position data in an absolute coordinate system. In this procedure, the reference target is used to obtain the angle orientation of the total station at the beginning of a measurement session (as for instance obtained after a calibration procedure) and checked before finishing the measurement session. Checking the position of the reference target relative to the angle orientation of the total station ensure that the total station has not moved during the measurement session."

However, also the verification method described in the above-cited passage of WO 2009/106144 A1 has to be carried out completely manually and is, therefore, cumbersome. An again, the reliability of such a verification depends on the skill of the operating person.

More information regarding a verification of the surveying instrument's orientation during a user's measurement session in the field is not given in WO 2009/106144 A1 at all, as actually the main technical teachings of WO 2009/106144 refer to completely different subject matters like to a method for calibrating a surveying instrument (see—among many other passages—page 12, lines 7-12 of WO 2009/106144 A1) or—as a minor matter—to a method for searching for a reference target (see e.g. page 23, lines 20-27 of WO 2009/106144 A1), which both form completely different topics compared to the matter of a method for verifying a surveying instrument's external orientation during a measurement session in the field.

Therefore, there is need for an improved method to determine and verify a surveying instrument's external orientation during a measurement session, particularly wherein the method can be carried out with less effort and with high reliability —independently from the skill of the operator.

SUMMARY

The method of the present invention for verifying a surveying instrument's external orientation during a measurement process is applicable for a surveying instrument having at least imaging means and angle measurement means for detecting an internal photographing direction of the imaging means relative to a base of the surveying instrument.

Therein, the method comprises the initialization steps of
 directing the imaging means onto a reference object and detecting a first photographing direction of the imaging means,
 taking a first image of the reference object in the first photographing direction, and
 memorizing the first image and the first photographing direction as being indicative of the surveying instrument's external orientation (exemplarily, the detected first photographing direction may be used as peg on which to link the surveying instrument's external orientation for the measurements to follow).

According to the invention, in a proceeded state of the measurement process (e.g. after a certain time period and after a part of the measurement tasks have been carried out or e.g. after an operator has inadvertent hit the surveying instrument) the further, verifying steps are performed for verification of the surveying instrument's external orientation (i.e. for verifying if the surveying instrument still is oriented in the same manner regarding its setting):
 re-directing the imaging means onto the reference object and detecting a second photographing direction of the imaging means,
 taking a second image of the reference object in the second photographing direction, and
 comparing a first with a second imaged position of the reference object in the first respectively the second image by image processing as well as the first with the second photographing direction and verifying the surveying instrument's external orientation based on disparities between the first and the second imaged position and/or between the first and the second photographing direction.

Therein, particularly, the verification may be performed in the following manners/embodiments:

According to a first embodiment of the method, the step of re-directing may be performed in such a way, that the second photographing direction exactly concurs with the first photographing direction. This means, after initiating the verification process, firstly the imaging means (particularly the aiming means/telescope, wherein the imaging means are integrated) are driven to the internal angle of the first photographing direction (i.e. the imaging means are re-directed exactly into the first photographing direction). After having taken the second image of the reference object in the second photographing direction, then, the surveying instrument's external orientation may be verified just based on a disparity between the first and the second imaged position.

According to an alternative second embodiment, the step of re-directing may be performed in such a way, that the second photographing direction is different from the first photographing direction. The surveying instrument's external orientation may then be verified based on the positions-disparity between the first and the second imaged position as well as the direction-disparity between the first and the second photographing direction. Therein, the position-disparity and the directions-disparity have to be brought into relation to each other.

Hence, according to that alternative second embodiment of the inventive method, it is not necessary to again exactly approach the first photographing direction after starting with the initialization steps, but the imaging means may be re-directed in such a way, that the second photographing direction roughly coincides with the first photographing direction. This may be an advantage compared to the first embodiment, because often it may be a problem for the motorization of surveying instruments to really exactly approach a previously measured angle of the telescope a second time with sufficient accuracy (i.e. the motorized change of alignment of the telescope can usually be done only less accurate than the angle read-out).

However, it may also merely be sufficient to re-direct the imaging means in such a way, that the reference object is still just within its field of view (coverage) when taking the second image into the second imaging direction. By taking into account the difference between the first and the second imaged positions in the first respectively the second image and the difference between the first and the second photographing directions, it can be verified if the external orientation has changed or not. Therefore, the difference between the first and the second imaged positions is put into relation with the difference between the first and the second photographing directions. E.g., a directing-angle-difference can be derived directly from the positions-disparity, and that directing-angle-difference can directly be compared with the disparity between the first and the second photographing direction. In case that the directing-angle-difference derived from the positions-disparity deviates from the disparity between the first and the second photographing direction, it is indicated that the surveying instrument's external orientation has changed.

According to a further, third embodiment, the step of re-directing may be performed in such a way, that the second imaged position of the reference object in the second image (which is taken in the second photographing direction) exactly concurs with the first imaged position of the reference object in the first image. Then, the surveying instrument's external orientation may be verified—particularly only—based on a disparity between the first and the second photographing direction.

Exemplarily for that third embodiment, the step of re-directing may be performed iteratively by successively changing the photographing direction and successively taking and processing images until the imaged position of the reference object exactly concurs with the first imaged position.

Of course, the inventive method may also be carried out according to further, not explicitly described embodiments lying still with the scope of the invention (e.g. combinations of the above-described embodiments).

Hence, according to the invention, verification methods for reviewing, monitoring and checking an initially set-up and given surveying instrument's orientation are provided, which can be carried out in a semi-automated (e.g. with guidance for an operator) or even full-automatic manner.

The surveying instrument may particularly be built as theodolite or total station, especially with motorization, and further comprise operating means as human-machine-interface and a controller such as a data processing unit having stored program code so as to be capable to execute the initialization and verifying steps of the above-described inventive methods.

Particularly, the imaging means may be integrated into an aiming telescope having a zoom lens with e.g. 30-way zoom. Therein, the lens of the aiming telescope may define an aiming axis, wherein the photographing direction may be coaxial or at least substantially coaxial with the aiming axis. The imaging means may e.g. be an on-axis camera, also being placed—in the optical path of the telescope—after the lens. Particularly, the imaging means should be calibrated with respect to the optics of the aiming telescope and the aiming axis.

Dependent on if the surveying instrument is provided with motorization means for changing the alignment and viewing direction of the imaging means, which may e.g. be integrated into an aiming-telescope, the step of re-directing the imaging means exactly into the first photographing direction may be carried out full-automatically or may be carried out by guiding an operator so as to help re-directing the imaging means e.g. exactly into the first photographing direction (see the first described embodiment of the inventive method).

Regarding the alternative second embodiment of the inventive method, the verifying step of re-directing the imaging means onto the reference object and detecting a second photographing direction of the imaging means may also be carried out full-automatically or may be carried out by guiding an operator so as to help re-directing the imaging means onto the reference object and await a users command for triggering the detection of the second photographing direction of the imaging means. The third particular embodiment of the inventive method may preferably be performed full-automatically and—as described—in iterative manner.

In general, the angle measurement means of the surveying instrument may be designed for detecting a horizontal angle and particularly additionally a vertical angle as internal photographing direction of the imaging means. If so, the step of comparing the first with the second imaged position may be performed in more detail by determining a horizontal pixel offset—and particularly additionally a vertical pixel offset—between the first and the second imaged positions in the first and second image, respectively, and the surveying instrument's horizontal external orientation—and particularly additionally its inclination (vertical alignment)—may be verified based on the horizontal pixel offset—and particularly also the vertical pixel offset.

Furthermore, dependent on the manner of carrying out the inventive method, also an amount of disorientation may be calculated and determined, the amount of disorientation particularly being horizontal and/or vertical displacement angles. E.g., regarding the first embodiment of the verifying method, the amount of disorientation (e.g. a horizontal offset angle about which the surveying instruments external orientation had changed during measurements, i.e. between the initialisation process and the verification process) can be derived directly from the pixel offset between the first and the second imaged position in the first respectively the second image (as described later on in more detail, see FIG. 6). Regarding the second embodiment, the pixel offset has to be put into relation with the offset between the first and the second photographing direction. E.g., the pixel offset may firstly be transformed into an angle offset. Then, the amount of change in orientation may result directly as difference between the and that angle offset and the offset between the first and the second photographing direction. At least regarding the first and second embodiment of the inventive method, the camera should be well calibrated (i.e. the camera constant should be known) for directly transforming/converting a pixel offset between the imaged positions in the first respectively the second image into an angle offset.

Regarding the third embodiment, the imaging means are re-directed—in connection with the verification—so that the second imaged position (in the verification image) exactly equals the first imaged position (in the initialisation image). Therefore, the amount of a change in orientation (which occurred timely between the initialisation process and the verification process) may result directly as an angle difference between the first and the second photographing direction.

In general, the resulting amount of disorientation may be used for correcting the value of the current surveying instrument's external orientation. As an example, a determined horizontal displacement angle—as amount of disorientation—can be used for correcting the current orientation of the surveying instrument by adding said horizontal displacement angle to the primarily set orientation. In this case, the changed orientation may automatically be considered for the oncoming surveying results, and there is no necessity that the user takes other measures to clear the changed orientation of the surveying instrument.

Optionally, also a warning signal can be issued if the amount of disorientation extends beyond a preset value. In this case, the user achieves information that the orientation has been changed beyond an admissible range. Thus, depending on the situation, the user can perform a new orientation for the surveying instrument, or he can consider other measures to correct the false orientation. The signal issued may be an optical signal, an audible signal, a vibrating signal or any other signal suitable to attract the user's interest.

Referring back to the step of comparing the first with the second imaged position, exemplarily in more detail, said step may be carried out by an edge extraction method. Here, especially a vertical edge, such as the vertical bar of a summit cross or church tower cross is accurately determined in the two images, respectively, and then the distance between the edges in the two images is used as the basis for the calculation of the displacement.

Alternatively, said step of comparing the first with the second imaged position of the reference object in the first respectively the second image can also be carried out by template matching. Therefore, a predetermined area around the reference object in the first image can e.g. be defined as a template. The template then can be matched in the second image so as to correspond with the reference object within the second image, and a displacement of the template between its position in the first and the second image can be determined, the displacement being indicative of the amount of disorientation of the surveying instrument.

In general, the surveying instrument comprises a telescope defining an aiming-axis and having integrated the imaging means, wherein crosshairs are superimposed in the image indicating the aiming-axis. In that case, as a detailed example for the template matching procedure, the predetermined area can be defined around the crosshairs in the first image as template and the centre of the crosshairs—which represents the aiming-axis in the first image—can be set as a reference point of the template. Then, the template can be matched within the second image, and a pixel offset between the position of the centre of the crosshairs in the second image and the position of the reference point of the matched template in the second image can be determined indicative of the disorientation of the surveying instrument.

Therein, in general, the crosshairs do not necessarily have to be displayed in the image (i.e. overlaid/superimposed onto the image), the position where the aiming axis would be depicted in the image may anyway be known. In that case, e.g., the aiming may be done by means of an ocular with a reticule, and the verification of the orientation (according to the invention) may be done separately with the camera, by using the known position where the aimed point is depicted. Hence, a pixel offset between the position where the aimed point is depicted and the position where the reference object is imaged in the second image may be determined and an angle-offset may derived therefrom.

According to a further aspect of the invention, instead of taking and storing only one image in connection with the initialization and verification procedures, also a series of images can be gathered (i.e. several images being captured consecutively in short time), the synopsis of the images of each series taking place of the first respectively the second image.

With other words, the steps of taking the first and the second image may comprise consecutively capturing several images in the first photographing direction as a first series of images of the reference object respectively consecutively capturing several images in the second photographing direction as a second series of images in the in a short predetermined time period (e.g. around 5-20 images immediately consecutively) and averaging information derivable from the images of the first series respectively the second series to take place of information derivable from the first respectively the second image.

Particularly, the positions of the reference object in each individual image of the first series are averaged and the positions of the reference object in each individual image of the second series of images are averaged and the averaged positions are taken as the first respectively the second imaged position.

Hence, for example, particularly in case of air flickering, the orienting-direction derived from an average of the imaged positions of the reference object in each of the consecutively captured images of the series may provide for a more precise indication of the "real" orienting-direction to the reference object compared to the case of processing only one single captured image.

Therefore, applying the method according to the invention in the above manner enables to clear out poor visibility conditions such as haze or air flickering occurring on hot days.

Particularly in connection with the initialization steps, the surveying instrument's orientation and optionally also its position can be determined in an absolute coordinate system by referencing the surveying instrument via several known reference objects, the positions of the reference objects being pre-known in the absolute coordinate system and the relative directions and/or distances to the reference objects being measured. Alternatively, the position of the surveying instrument may also be taken from a map, e.g. if set-up upon a known georeferenced point mark.

Particularly, if each of the above-described steps of the inventive methods is repeated with at least two more reference objects, in addition to the orientation, the position of the surveying instrument can be verified by an intersection step or by a resection step after the certain time period. Thus, apart from the orientation, the position of the surveying instrument can be verified analogously, and a change of the surveying instrument's position can be determined or noticed if this position remained unchanged.

According to a further aspect of the invention, a reminder signal can be issued after a predetermined time period has passed since the initial determination of the surveying instrument's external orientation or since the last orientation verification has been carried out, and the verifying steps can be carried out upon a manual command from a user or automatically after a further predetermined time period has passed.

Also, the verifying steps can be repeated during the measurement process in predetermined time intervals, particularly wherein the verifying steps are automatically carried out in a repeated manner in the predetermined time intervals.

In that case, in connection with each completion of the verifying steps, an amount of disorientation can be determined and an orientation-function of time may be derived from the amounts of disorientation, particularly by a regression analysis, especially by linear regression, wherein the surveying instrument's external orientation is plotted over time. Hence, the measurement results gathered in connection with the measurement process can be corrected according to that orientation-function, i.e. dependent on its respective gathering point of times and said derived orientation-function.

The method of the invention advantageously enables a user to realize if the orientation of a surveying instrument has changed while working with the surveying instrument. It is possible to perform the verification automatically, that is, after a predetermined period has passed, or alternatively, it can be performed upon a manual command. The latter can be given in a case where the user is aware that the orientation might have been changed, e.g. if the surveying instrument has been subjected to an impact.

Especially, the method of the invention enables to verify the orientation of a surveying instrument, without the need to previously determine the surveying instrument's position. This latter case may be performed, if a local coordinate system is used which is not embedded in a global coordinate system. Here, any significant point may be used as the reference object. Hence, it has to be noted that an orientation value does not necessarily have to be initially determined for carrying out and making use of the verification method according to the invention. Rather, the basic point of the invention is to provide for a method, with which a change of orientation in the setup of the surveying station—which potentially may occur during measurements—can at least be registered (and particularly also determined in its displacement value).

Summed up, according to the invention, a horizontal displacement angle can be calculated on the basis of a horizontal image coordinate data difference of a predetermined reference point in the two images. Therein, according to the first embodiment, it is not necessary in connection with the verifying steps to again measure the horizontal angle from the surveying instrument to the reference object, but merely sufficient to exactly approach the stored, first aiming direction and to take the second image. Furthermore, it is possible to additionally calculate a vertical displacement angle on the basis of a vertical image coordinate data difference of the position of the predetermined reference point in the two images. From calculating the vertical displacement angle, apart from a horizontal and/or vertical displacement, a change of the surveying instrument's inclination can be determined.

As explained above, for verifying the horizontal and/or the vertical displacement, a defined area around crosshairs in the first image, for instance an image section of the first image, can be defined as a template. Then, a reference point can be defined in the template, and in the second image a horizontal and/or vertical displacement can be determined as the distance from the reference point which was defined in the first image to the crosshairs position in the second image. In this case, image coordinate data of the reference point can be determined in the second image, and the horizontal and/or vertical displacement can be determined from the image coordinate data.

As also already mentioned above, the method can automatically be carried out in a repeated manner in predetermined intervals. This ensures a frequent verification of the surveying instrument's orientation and reduces a risk that the user forgets to manually verify the orientation. Alternatively, or additionally, a manual activation of the verification is any time possible by the user.

Furthermore, a reminder signal can be issued after a predetermined time period has passed since the initial determination of the orientation or since the last orientation verification. Then, the method for verifying the surveying instrument's orientation can be carried out upon a manual command from a user, or automatically after a further predetermined time period has passed. Thus, the user is not interrupted in his present surveying task, but learns that the orientation verification is to be performed. Should the user, however, forget to manually initiate the orientation verification the orientation verification can be automatically started. The automatically started orientation verification can begin directly after, or with a slight delay after another warning signal indicating the start has been issued.

Also summed up, the surveying instrument according to the invention comprises imaging means (also called image capturing means, e.g. a camera), a rotating means for moving the image capturing means, a horizontal angle measuring means, a vertical angle measuring means, a controller, and an operating means for manually operating the surveying instrument. The controller is adapted to calculate a horizontal displacement angle and/or a vertical displacement angle from a displacement between two images of a reference object, which were taken at different times and at least one of which is stored in a memory, and, thus, to verify whether the surveying instrument's orientation at the second time corresponds to the orientation at the first time.

As known from the state of the art, the surveying instrument may also be controlled in a remote manner, e.g. by a handheld data logger with radio link to the surveying instrument body (the data logger thus working as remote controller and e.g. providing same display- and control-functionalities as provided by the controlling-unit directly attached to the instrument body). However, alternatively, the surveying instrument may also be remotely controlled e.g. by a laptop, a PC, a PDA or a smart phone with appropriate data linking means (e.g. also over the internet).

Furthermore, the invention also relates to computer program product with program code being stored on a machine readable medium, the program code being configured to automatically execute and operate the inventive method for verifying a surveying instrument's external orientation as explained above, particularly if the program is carried out on a control unit of the surveying instrument.

BRIEF DESCRIPTION OF THE DRAWINGS

Exemplary embodiments of the invention will be described on the basis of the attached figures.

FIG. 4b is a detail of FIG. 4a, FIG. 5 is an illustration of a corresponding second image captured while performing the preferred embodiment of the invention.

Exemplary embodiments of the invention will be described on the basis of FIGS. 3 to 5.

DETAILED DESCRIPTION

Figure 3A:
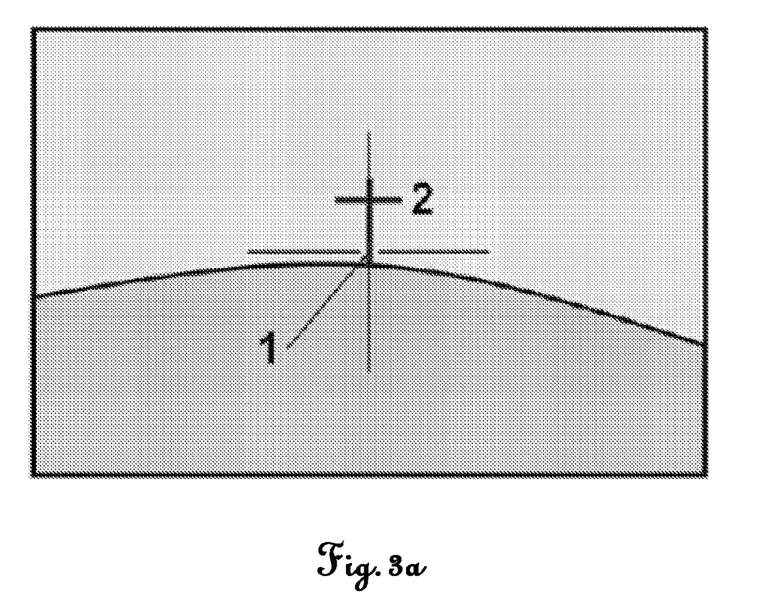
FIG. 3a is an illustration of a first image captured while performing an embodiment of the invention.

FIG. 3a is a schematic illustration of a first image captured by a camera mounted on a total station being a surveying instrument according to the invention, when the total station is directed in a predetermined angle, for instance 100.000 Gon (1 Gon corresponds to $\frac{1}{400}$ of a full circle. Thus, 100.000 Gon corresponds to a right angle.).

The captured image shows a summit cross 2 which is a reference object according to the invention. The image is stored in a memory provided at the total station together with a measured direction angle. For this purpose, crosshairs 1 of a camera of the total station is aimed on the summit cross 2, that is, the crosshairs 1 are exactly aimed at the base point of the summit cross's 2 vertical bar.

Furthermore, according to a particular embodiment of the inventive method where the global position of the surveying instrument is also determined in advance, at the same time the orientation of the total station is determined, that is, the angle between the north direction (x-axis) of a global coordinate system and the direction zero of the surveying instrument is determined using the known coordinates of the summit cross 2 and the beforehand determined coordinates of the total station.

For determining the coordinates of the total station, various possibilities are known. For instance, the position can be determined by placing the total station on a beforehand surveyed point the coordinates of which are known, by determining the coordinates using surveying methods such as resection or intersection, taking the coordinates from a map or others. However, it has to be noted that an orientation value does not necessarily have to be initially determined for the verification method according to the invention. Rather, the basic point of the invention is to provide for a method, with which a change of orientation in the setup of the surveying station has occurred during measurements.

After the orientation of the surveying instrument is initially determined or just given according to the set-up of the instrument in the field or on the street, the user starts performing the surveying tasks. Then, after a predetermined time period has passed, a controller provided with the total station automatically causes the total station to be directed to the previously measured horizontal angle (for instance 100.000 Gon) and to take a second image schematically shown in FIG. 3b, to verify the orientation of the total station.

Alternatively, the same process can be initiated upon a manual command by the user. This is especially useful for avoiding an interruption of the present surveying task. Especially it is preferred, that the controller gives a signal after the predetermined time period has passed, upon which signal the user may finish the present surveying task and then initiate the automatic verification of the orientation manually. Should the user forget to initiate the automatic verification of the orientation, the controller can submit another reminder signal, or can even start to automatically verify the orientation after another appropriate time period has passed.

Figure 3B:
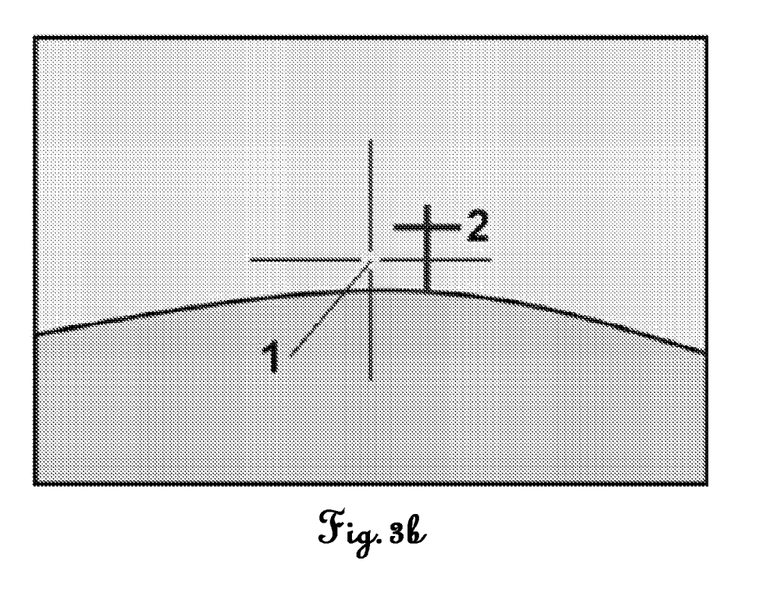
FIG. 3b is an illustration of a corresponding second image captured while performing the embodiment of the invention.

As can be seen from FIG. 3b, the crosshairs 1 are not any longer targeted onto the summit cross 2 but is slightly displaced. Thus, the orientation of the total station has obviously changed. The change of the orientation, that is the horizontal displacement, or the vertical displacement as well as the change of the inclination can be calculated on basis of the reference point's displacement in the image.

According to a presently preferred embodiment, in order to exactly verify the displacement of the total station and, thus, the change of the orientation, a template matching method is applied. Such a template matching method will be described on the basis of FIGS. 4a, 4b and 5.

Figure 4A:
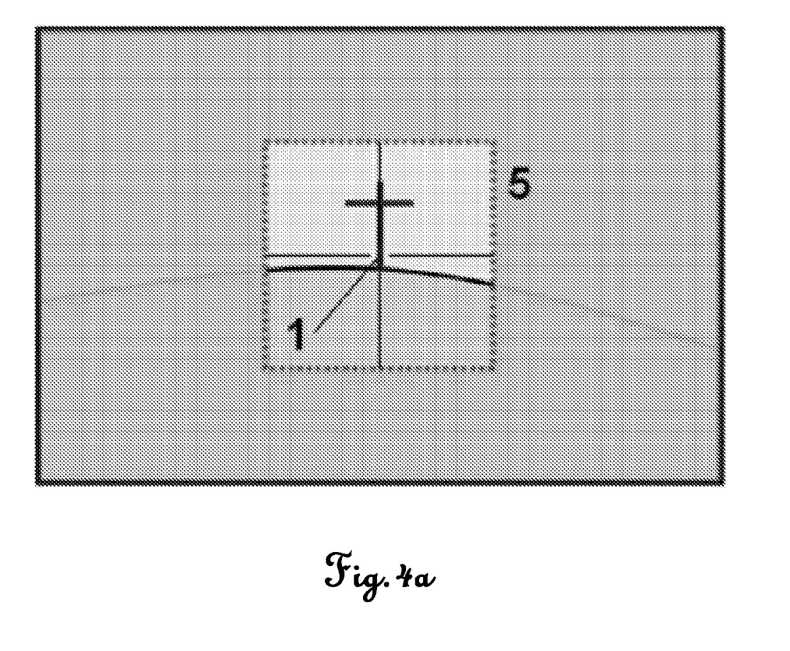
FIG. 4a is an illustration of a first image captured while performing a preferred embodiment of the invention.

In FIG. 4a, the crosshairs 1 aim on a base point 6 of the summit cross. The base point 6 corresponds to a reference point. As can be taken from FIG. 4a, an image section 5 corresponding to an area surrounding the crosshairs in FIG. 4a is defined as template 5. This template 5 is defined, when the orientation of the total station is determined for the first time. Furthermore, the template 5 is stored in a memory provided at the total station.

Figure 4B:
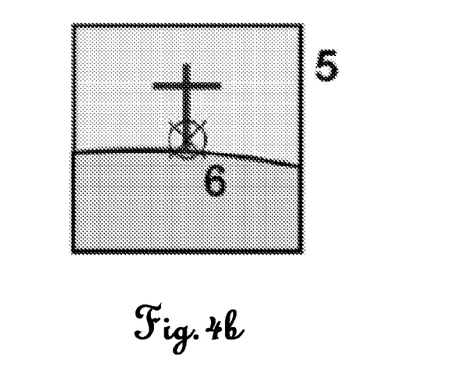

FIG. 4b shows the exact details of the template 5. Reference sign 6 corresponds to the reference point, which is the position of the crosshairs 1 in the first image and is also stored in the memory.

Figure 5:
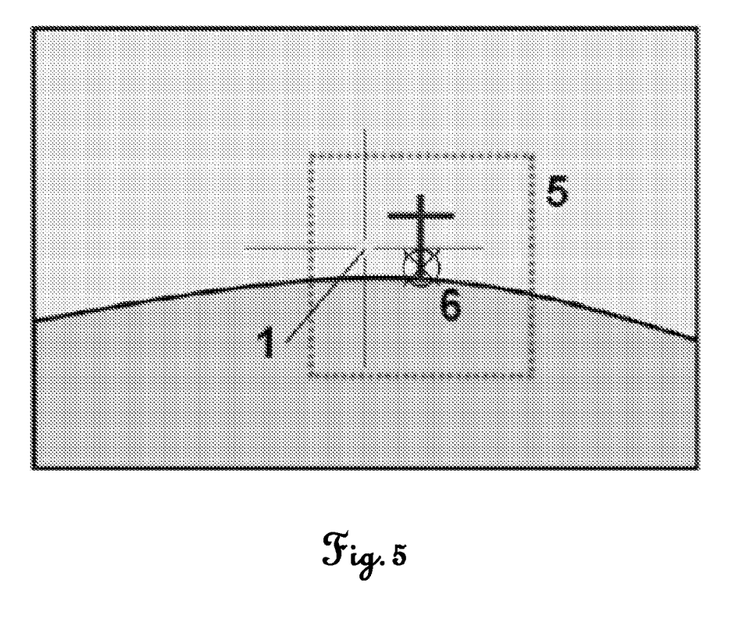

The orientation is to be verified automatically after a predetermined time, or, alternatively, manually upon a command from the user after a reminder signal to perform the orientation verification has been issued. Then, driven by a motor corresponding to a rotating means according to the invention, the total station directs itself to the direction taken when the orientation was determined and the template 5 was defined. That is, the total station takes the same angle as before when the orientation was determined. In the example mentioned with reference to FIGS. 3a and 3b, the angle was 100.000 Gon. Then, a second image shown in FIG. 5 is taken and in FIG. 5 the image section corresponding to the template 5 as well as the reference point 6 is determined. Furthermore, in the image of FIG. 5, the image coordinate data of the reference point 6 are determined.

Then, on the basis of the image coordinate data of the reference point 6, a horizontal displacement, a vertical displacement and, furthermore, a possibly occurred inclination of the total station compared to the initial orientation can be determined. If the displacement exceeds a predetermined value which can be set by the user, furthermore, an alert signal is issued and the user can take countermeasures.

As a possible countermeasure, for instance the displacement angle can be added to the original orientation angle. Then, the corresponding updated orientation angle can be used for the following surveying tasks. Another possibility is to newly determine the orientation and to continue the surveying work with the new orientation, or to return the surveying instrument back to the initial orientation.

While in the embodiment template matching was described as method for determining the displacement, it is to be noted that any other suitable image analyzing methods can be applied. For instance, it is possible to extract a vertical edge of the summit cross 2 of FIGS. 3a and 3b and to determine the displacement on the basis of this edge extraction. This is especially applicable in a case, where it is sufficient to merely determine the horizontal orientation displacement.

Also, while the embodiment was described for a case where the coordinate data of the total station are known, it is to be noted that the knowledge of the coordinate data of the total station's position are not necessary to carry out the invention. That is, when working in a local coordinate system chosen by the user, any arbitrarily chosen object may serve as reference object, and its coordinate data are not necessarily to be known for performing the invention. Again, the basic point of the invention is to provide for a method, with which a change of orientation in the setup of the surveying station has occurred during measurements. Hence, a value (zero direction) for the external orientation does not necessarily have to be initially determined for the verification method according to the invention.

Figure 6:
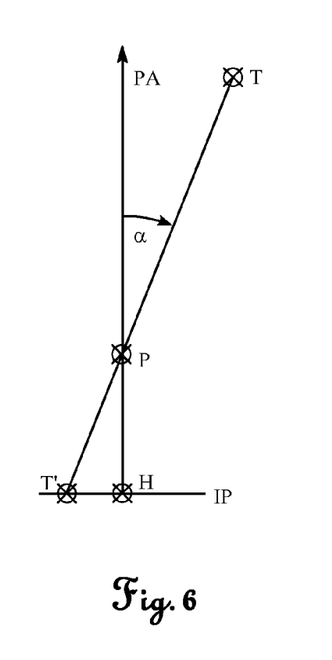
FIG. 6 shows how—in principle—a pixel offset in an image may be transformed into a direction/angle offset.

FIG. 6 shows how—in principle—a pixel offset (T' from H) in an image (taken with camera sensor IP) may be transformed into a direction/angle offset a (without knowledge of a distance to the target or the exact absolute position of the surveying instrument). Therein, the lenses of the surveying instrument's aiming device (e.g. telescope) may be at position P and may define an aiming axis PA (the aiming axis PA—in the shown case—coinciding with the imaging direction of the on-axis camera sensor IP). The aiming axis may be projected onto the sensor IP at position H. If the camera is calibrated (i.e. if its camera constant is known), the offset of the position T' (where a target point is projected on the sensor IP) from the position H in the image can directly be transformed (or converted)—by using triangulation—into a direction offset between the aiming axis PA and the direction given from the lens P to the target point P, the direction offset then corresponding to the displacement angle $\alpha$.

While the invention was described on the basis of presently preferred embodiments thereof, it is to be understood that it can be performed in many different ways. Thus, it will be readily understood, that the described embodiments are not to be considered as a limitation for the scope of the invention, which is defined by the scope of the attached claims. E.g., the verification of the horizontal orientation can be performed on the basis of a horizontal pixel offset and a verification of the longitudinal tilt (vertical alignment) on the basis of a vertical pixel offset. However, according to the invention it is moreover possible to verify the transverse tilt of the surveying instrument on the basis of a rotation angle of the template in the second image with respect to the first image. Hence, a change in the rolling angle (transverse tilt) of the surveying instrument's setup may also be registered and compensated for according to the invention. Therefore, not only the imaged positions of the reference object in the first and second images may be compared, but also a rotation angle of the imaged reference object (or of a template matched with the imaged reference object) in the first respectively the second image.

What is claimed is:

1. A method for verifying a surveying instrument's external orientation during a measurement process, wherein the surveying instrument is at least provided with imaging means and angle measurement means for detecting an internal photographing direction of the imaging means relative to a base of the surveying instrument, the method comprising the initialization steps of:

directing the imaging means onto a reference object and detecting a first photographing direction of the imaging means;

taking a first image of the reference object in the first photographing direction;

memorizing the first image and the first photographing direction as being indicative of the surveying instrument's external orientation, and in a proceeded state of the measurement process the further, verifying steps of:

re-directing the imaging means onto the reference object and detecting a second photographing direction of the imaging means;

taking a second image of the reference object in the second photographing direction; and comparing a first with a second imaged position of the reference object in the first respectively the second image by image processing as well as the first with the second photographing direction and verifying the surveying instrument's external orientation based on disparities between the first and the second imaged position and/or between the first and the second photographing direction.

2. A method according to claim 1, wherein:
the step of re-directing is performed in such a way, that the second photographing direction exactly concurs with the first photographing direction; and
the surveying instrument's external orientation is verified based on a disparity between the first and the second imaged position.

3. A method according to claim 1, wherein:
the step of re-directing is performed in such a way, that the second photographing direction is different from the first photographing direction; and
the surveying instrument's external orientation is verified based on a disparity between the first and the second imaged position and based on a disparity between the first and the second photographing direction.

4. A method according to claim 1, wherein:
the step of re-directing is performed in such a way, that the second imaged position of the reference object in the second image taken in the second photographing direction exactly concurs with the first imaged position of the reference object in the first image; and
the surveying instrument's external orientation is verified based on a disparity between the first and the second photographing direction.

5. A method according to claim 4, wherein the step of re-directing is performed iteratively by successively changing the photographing direction and successively taking and processing images until the imaged position of the reference object exactly concurs with the first imaged position.

6. A method according to claim 1, wherein:
the angle measurement means are designed for detecting a horizontal angle as internal photographing direction of the imaging means;
the step of comparing the first with the second imaged position comprises determining a horizontal pixel offset between the first and the second imaged position; and
the surveying instrument's horizontal external orientation is verified based on the horizontal pixel offset.

7. A method according to claim 1, wherein:
the angle measurement means are designed for detecting a horizontal angle and a vertical angle as internal photographing direction of the imaging means;
the step of comparing the first with the second imaged position comprises determining a horizontal pixel offset and a vertical pixel offset between the first and the second imaged position; and the surveying instrument's horizontal and vertical external orientation is verified based on the horizontal pixel offset and the vertical pixel offset.

8. A method according to claim 1, wherein the step of verifying the surveying instrument's external orientation further comprises determining an amount of disorientation of the surveying instrument, the amount of disorientations particularly being horizontal and/or vertical displacement angles, based on the disparity between the first and the second imaged position and/or the disparity between the first and the second photographing direction, respectively.

9. A method according to claim 8, wherein the amount of disorientation is used for correcting the value of the current surveying instrument's external orientation and/or a warning signal is issued if the amount of disorientation extends beyond a preset value.

10. A method according to claim 1, wherein the steps of taking the first and the second image comprise capturing a first series of images of the reference object in the first photographing direction respectively capturing a second series of images of the reference object in the second photographing direction and averaging information derivable from the images of the first series respectively the second series to take place of information derivable from the first respectively the second image.

11. A method according to claim 10, wherein the positions of the reference object in each individual image of the first series are averaged and the positions of the reference object in each individual image of the second series of images are averaged and the averaged positions are taken as the first respectively the second imaged position.

12. A method according to claim 1, wherein the step of comparing the first with the second imaged position of the reference object in the first respectively the second image is carried out by template matching.

13. A method according to claim 12, wherein:
a predetermined area around the reference object in the first image is defined as a template;
the template is matched to the reference object within the second image; and
a displacement of the template between its position in the first and the second image is determined.

14. A method according to claim 13, wherein an amount of disorientation of the surveying instrument is derived from the displacement of the template.

15. A method according to claim 13, wherein
the surveying instrument comprises a telescope defining an aiming-axis and having integrated the imaging means, wherein crosshairs are superimposable indicating the aiming-axis in the image; and
the predetermined area is defined around the crosshairs in the first image as the template and the centre of the crosshairs representing the aiming-axis in the first image is set as a reference point of the template;
the template is matched within the second image; and
a pixel offset between:
the position of the centre of the crosshairs in the second image; and
the position of the reference point of the matched template in the second image, is determined indicative of a disorientation of the surveying instrument.

16. A method according to claim 1, wherein the step of comparing the first with the second imaged position of the reference object in the first respectively the second image is carried out by an edge extraction method.

17. A method according to claim 1, wherein a reminder signal is issued after a predetermined time period has passed since the initial determination of the surveying instrument's external orientation or since the last orientation verification has been carried out, and the verifying steps are carried out upon a manual command from a user or automatically after a further predetermined time period has passed.

18. A method according to claim 1, wherein the verifying steps are repeated during the measurement process in predetermined time intervals, particularly wherein the verifying steps are automatically carried out in a repeated manner in the predetermined time intervals.

19. A method according to claim 18, wherein:
for each verification of the surveying instrument's external orientation an amount of disorientation is determined and an orientation-function of time is derived from the amounts of disorientation, particularly by a regression analysis, especially by linear regression, wherein the surveying instrument's external orientation is plotted over time; and
measurement results gathered in connection with the measurement process are corrected dependent on its respective gathering point of times and the derived orientation-function.

20. A surveying instrument, comprising:
imaging means;
angle measurement means for detecting an internal photographing direction of the imaging means relative to a base of the surveying instrument;
operating means;
a control unit,
wherein the surveying instrument is provided with a semiautomatic or full-automatic functionality for verifying the surveying instrument's external orientation during a measurement process, the control unit therefore being adapted to execute the initialization steps of:
directing the imaging means onto a reference object and detecting a first photographing direction of the imaging means;
taking a first image of the reference object in the first photographing direction;
memorizing the first image and the first photographing direction as being indicative of the surveying instrument's external orientation, as well as to execute, in a proceeded state of the measurement process, the further, verifying steps of:
re-directing the imaging means onto the reference object and detecting a second photographing direction of the imaging means;
taking a second image of the reference object in the second photographing direction; and
comparing a first with a second imaged position of the reference object in the first respectively the second image by image processing as well as the first with the second photographing direction and verifying the surveying instrument's external orientation based on disparities between the first and the second imaged position and/or between the first and the second photographing direction.

21. A tangible computer program storage product with program code being stored on a non-transitory machine readable medium, the program code being configured to automatically execute and operate the method for verifying a surveying instrument's external orientation according to claim 1.

22. A theodolite or total station comprising the tangible computer program storage product of claim 21.

* * * * *